United States Patent Office 3,313,611
Patented Apr. 11, 1967

3,313,611
APPARATUS FOR MANUFACTURING GLASS RIBBON ON A MOLTEN METAL BATH
Jean De Keersmaecker, Couillet, Belgium, assignor to Glaverbel, Brussels, Belgium
Filed Sept. 26, 1963, Ser. No. 311,723
Claims priority, application Luxembourg, Sept. 28, 1962, 42,435
4 Claims. (Cl. 65—182)

This invention relates to apparatus for the manufacture of a glass ribbon, more particularly to apparatus of the kind in which the glass ribbon is first formed and then deposited on a bath of molten material on the surface of which said glass ribbon is advanced by sliding on said surface.

In known processes and plants of the kind specified, the glass ribbon is formed by rolling or by casting from a sill at the end of a glass melting tank whereafter the formed ribbon is deposited onto a bath of molten metal where said ribbon is progressively cooled until it can be engaged by mechanical transporting means, for instance transporter rollers, without damage to the ribbon surface. In certain processes and plants the glass ribbon is first re-heated on the metal bath to give it a fire polish and to eliminate possible defects in the glass caused by the glass-forming means, whereafter the ribbon is progressively cooled in the afore-described manner.

It has been proposed to use for the bath of molten metal, a metal whose melting point is fairly low, for instance below 700° C., such metals being for example, tin, lead and their alloys. These metals have the advantage of being liquid over the range of temperatures in which glass is plastic, but they are subject to oxidation by atmospheric air, particularly in the liquid state. The glass ribbon is therefore deposited onto a surface of molten metal containing particles of the metal oxide. Such particles become encrusted on the surface of the glass ribbon and damage the same. A non-oxidizing atmosphere has been provided to prevent the oxidation of the molten metal, but it is not possible to prevent all air from entering the plant, so that in practice oxide formation is reduced but not completely obviated.

It has also been known to use metals which are not oxidized by atmospheric air at operating temperatures, for instance, silver. The surface of such metals remains bright and free from oxides. However, such metals solidify at a rather high temperature, 962° C. in the case of silver, so that the glass ribbon must pass out of the bath in a highly plastic state, and this requires the exercise of special precautions to prevent the ribbon surface from being damaged by the mechanical transporting means which seize such ribbon when it leaves the bath of molten metal.

The present invention provides a plant which obviates the afore-mentioned disadvantages and moreover provides a number of advantages to be described hereinbelow.

According to the invention, the glass ribbon is first deposited onto a bath of molten material which is unaffected by air, preferably a bath of a non-oxidizable metal. Then, the ribbon is slid over such bath and is thereafter slid over at least one other bath of molten material having a lower melting point and at a lower temperature than the material of the first bath. As it moves over said other bath, the glass is sufficiently solidified by cooling so that it can be engaged by the mechanical transporting means without damage to its surface.

According to the invention, the glass ribbon is deposited onto the oxide-free surface of the first bath and solidified on the surface of the second bath.

The oxides are formed and most easily become interposed between the bath of molten material and the glass ribbon at precisely the place where the glass ribbon is deposited onto the bath. The use of material unaffected by air, such as a nonoxidizable metal, obviates a considerable cause of damage to the glass ribbon. The use of a second bath having a lower melting point enables the glass ribbon to solidify without the risk of damage from the mechanical transporting elements. Since the temperature of the second bath is relatively low, protection can easily be provided against oxidation.

If for any reason it is desired to heat the glass ribbon on the bath of molten metal, more particularly to improve the fire polish, such heating is preferably carried out in the bath of non-oxidizable metal, that is, at a place where the glass ribbon is completely protected from metal oxides over the period during which it is heated to a high temperature and is therefore less subject to damage.

Advantageously, if it is desired to heat the glass ribbon on the bath of molten metal at a temperature sufficient to spread the glass out and reduce its thickness on such bath, the glass is spread out on the bath of non-oxidizable metal. The glass ribbon can easily spread out in very thin layers, for instance of 1 millimetre, on metals, such as silver, while on molten tin the glass ribbon cannot spread out to a thickness of less than 5 millimetres without requiring the application of external tension force. After the glass has been reduced in thickness on the bath of non-oxidizable metal and undergone a first cooling, the glass ribbon can then be transferred to the bath of lower melting temperature without the glass thickening. A simple process and plant are therefore provided for the production of a thin glass ribbon.

Preferably, according to a feature of the invention, between the first and second baths the glass ribbon is slid over a solid substance which is inert to glass at the operating temperatures. In this way the glass ribbon is prevented from being deformed or damaged during its passage between the two baths of molten metal. By the suitable joining of the upper surface of the solid substance to the surface of the bath of molten metal, air is prevented from becoming interposed between such bath and the glass ribbon, and therefore oxides are prevented from becoming formed at the juncture and damaging the glass surface.

A plant for performing the afore-described process of manufacturing a glass ribbon comprises means for forming the glass ribbon and a tank containing a bath of molten material unaffected by air, and more particularly a metal which is non-oxidizable by atmospheric air. The plant also comprises at least one other tank containing molten material, more particularly a molten metal which has a lower melting point than the material, for example, the non-oxidizable metal, contained in the first tank. The formed ribbon of glass is first deposited on the bath of non-oxidizable metal. After being heated on such bath the glass ribbon undergoes a first cooling whereafter it slides over the bath of metal with a lower melting point and becomes completely solidified. The baths of molten metals are prevented from mixing by the fact that they are disposed in different tanks, because such mixing would cause a deterioration in the resistance to oxidation of the molten material in one tank and raise the melting point of the material in the other tank.

Advantageously, the plant comprises at least one solid substance whose upper surface is disposed between the two tanks at substantially the same level as that of the baths contained in such tanks, the glass ribbon passing from one tank to the other by sliding over the surface of the solid substance. Preferably, the upper surface of the solid substance is of convex shape and partly immersed in each of the molten metal baths. If the solid substance is carbon, the causes of damage to the glass ribbon when the ribbon is transferred from one metal bath to another are eliminated.

Advantageously, the solid substance forms a wall of at least one of the tanks containing a bath of molten metal. By the fact that such substance is brought into contact with a bath of molten metal it attains a temperature substantially equal to that of the liquid metal in which it is immersed and the glass ribbon is prevented from suffering a sudden temperature change. By forming the front wall of one tank and the rear wall of another tank by the same solid substance it is insured that the glass will follow a particularly regular temperature course during its passage from one bath to another.

Specific embodiments of the invention will now be described by way of example with reference to the accompanying diagrammatic drawings, in which.

Figure 1:
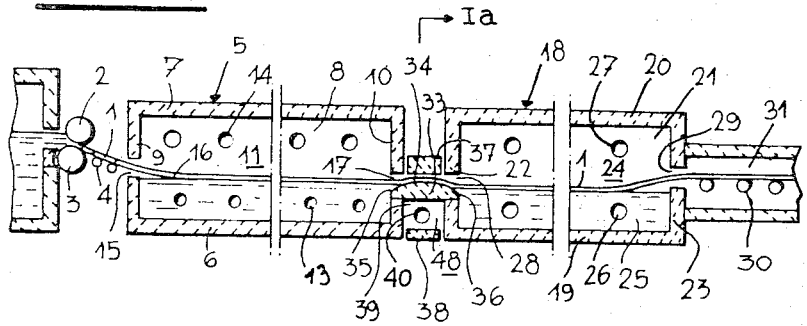
FIGURE 1 is a vertical section through a plant according to a first embodiment of the invention.
Figure 1A:
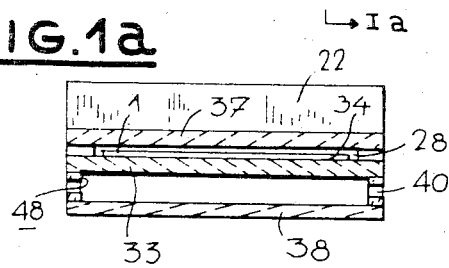
FIGURE 1a is a transverse section of said plant along the line Ia—Ia of FIGURE 1.

Referring to the drawing, the plant comprises at the outlet from a glass melting tank a means for forming a glass ribbon 1, such means comprising two casting rollers 2, 3. Downstream of the rollers 2, 3 the plant comprises transporter rollers 4 over which the glass ribbon 1 moves towards a first furnace 5. The furnace 5 has a bottom 6, a top 7, side walls 8 and end walls 9, 10. The bottom 6 and the lower parts of the side walls 8 and end walls 9, 10 form a first tank 11 containing a bath of molten material unaffected by air, for instance a bath 12 of a non-oxidizable metal such as silver, gold or alloys thereof containing a considerable proportion of such metals. The furnace 5 comprises means for heating the non-oxidizable metal bath 12 and which may be for instance electric resistances 13 located below the level of the metal bath 12. Other heating elements as for example electric resistances 14 are provided above the bath 12 in the tank 11 to control the temperature of the gaseous atmosphere above such bath in the tank.

The glass ribbon 1 is conveyed by the transporter rollers 4 and introduced into the tank 11 through an inlet slot 15 in the front end wall 9 of the first furnace 5. The inlet slot 15 is located a small distance above the level of the metal bath 12, so that the glass ribbon 1 is deposited on such bath at a location 16 relatively close to the front end wall 9 of the tank 11. At the location 16 the temperature of the glass is slightly higher than the melting point of molten silver, that is, 962° C. Also at the location 16 the surface of the bath 12 is not exposed to the atmosphere so that there is no risk of metal oxide being entrained between the ribbon 1 and the bath 12.

Since the glass is less dense than the non-oxidizable metal of the bath 12, the glass ribbon 1 floats on such bath. The glass ribbon 1 therefore slides forward over the bath 12, and is then brought out of the tank 11 through an outlet slot 17 in the rear end wall 10 of the first furnace 5.

Downstream of the first furnace 5 the plant comprises a second furnace 18. The furnace 18 has a bottom 19, a top 20, side walls 21 and end wall 22, 23. The bottom 19 and the lower parts of the side walls 21 and end walls 22, 23 form a second tank 24 containing a bath of molten material which has a lower melitng point than the bath contained in the first tank 11. The second bath of molten material is, for instance, a bath 25 of metal whose melting point is relatively low, such as tin or lead. The furnace 18 also comprises means for heating the metal bath 25, such as, for instance, electric resistances 26 extending over the whole width of the tank 24 below the level of the metal bath 25. The furnace 18 also comprises other heating elements such as electric resistances 27 located across the furnace above the level of the metal bath 25 to control the temperature of the gaseous atmosphere above such bath in such tank.

In the embodiments shown, the two metal baths 12 and 25 contained in the tanks 11 and 24 respectively are at the same level and have the same depth. The invention also covers cases in which the level of the bath 12 is different from that of the bath 25 and/or cases in which the depths of such baths are different.

Advantageously, in some plants, baths are provided such as baths 12 and 25 which have different depths to allow for the different heat properties of the molten materials, for instance the liquid metals used.

The second furnace 18 is disposed in alignment with the first furnace 5, so that the glass ribbon 1 leaving the furnace 5 is conveyed into the furnace 18 through an inlet slot 28 in the front end wall 22 of the furnace 18. Since the metal forming the bath 25 is denser than the glass, the glass ribbon 1 floats on the bath 25 and is slid over the bath 25 in the furnace 18.

The glass ribbon 1 comes out of the furnace 18 through an outlet slot 29 in the rear end wall of the furnace 18 after the glass has been raised from the surface of the bath 25 by means of transporter rollers 30 disposed in an annealing lehr 31.

The outlet slot 29 is located a small distance above the level of the bath 25 so that the glass ribbon 1 comes out of the bath 25 at a location 32 relatively close to the rear end wall of the furnace 18.

The glass ribbon is cooled as it passes through the two furnaces 5 and 18. The temperatures of the baths and of the gaseous atmospheres of the furnaces are so controlled that the glass is progressively solidified and at the location 32 it is sufficiently solidified such that the surface of the glass ribbon 1 will not be damaged by the transporter rollers 30.

The two embodiments illustrated differ in the means of connecting the furnaces 5 and 18 together.

In the first embodiment illustrated in FIGURE 1, the plant comprises a plate 33 of carbon which is supported on the lower lips of the slots 17 and 28 in the rear end wall of the furnace 5 and the front end wall of the furnace 18 respectively. The surface 34 of the plate 33 is curved and has an upwardly facing convex surface. The edges 35, 36 of the plate 33 are located at a level lower than the common level of the metal baths 12 and 25 so that part of the upper surface 34 of the plate 33 is immersed in the metal baths 12 and 25.

Above the plate 33 is disposed a crown 37 of refractory material extending between the end wall 10 and the end wall 22. Below the plate 33 is disposed another plate 38 of refractory material extending from the furnace bottom 6 to the furnace bottom 19. Side walls 39 are placed against the crown 37, the plate 38 and the end walls 10 and 22 to form a connecting corridor between the furnaces 5 and 18, the glass ribbon 1 moving through such corridor. Beneath the plate 33 is located a known form of heating means such as an electric resistance 40 which enables the plate 33 to be heated to an appropriate temperature.

The glass ribbon 1 slides over the upper surface 34 of the convex plate 33 as it passes from the metal bath 12 to the metal bath 25.

Figure 2:
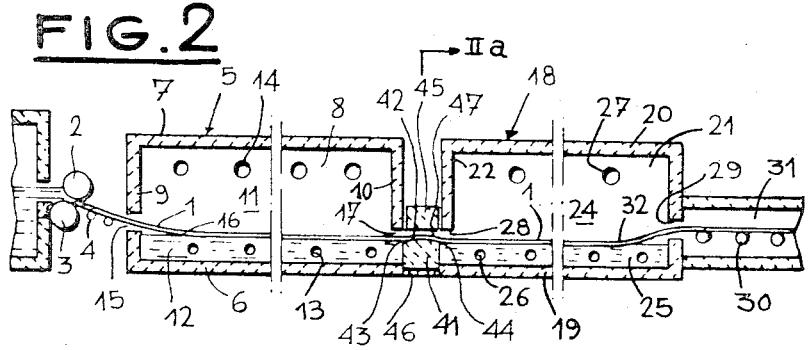
FIGURE 2 is a vertical section through a plant according to a second embodiment of the invention.
Figure 2A:
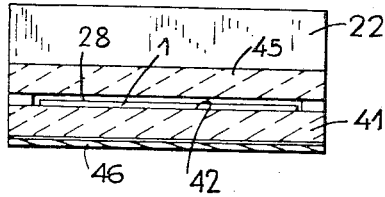
FIGURE 2a is a transverse section of the second plant, along the line IIa—IIa of FIGURE 2.

In the second embodiment illustrated in FIGURE 2, a block 41 of carbon is disposed between the two furnaces 5 and 18. The end walls of the block 41 form the lower part of the rear end wall 10 of the furnace 5 and the lower part of the front end wall 22 of the furnace 18.

The upper surface 42 of the block 41 is convex and the edges 43, 44 of the block 41 are immersed in the metal baths 12 and 25 contained in the tanks 11 and 24 respectively. Above the block 41 is disposed a plate 45 of refractory material extending between the end wall 10 and the end wall 22. Below and against the block 41 is disposed a plate 46 which protects the block 41 against oxidation. Side plates 47 of refractory material are disposed against the plate 45, the block 41 and the end walls 19, 22 to form between the fusnaces 5 and 18 a connecting corridor through which the glass ribbon 1 moves. When passing from the metal bath 12 to the metal bath 25 the glass ribbon 1 slides over the upper surface 42 of the block 41.

The second embodiment is particularly advantageous because block 41 is in intimate contact with the metal baths and is therefore kept at a temperature close to the temperatues of such baths.

The carbon of which the plate 33 and the block 41 are formed does not damage the lower surface of the glass ribbon 1 sliding over such plate or block. To protect the carbon against oxidation, a neutral or reducing atmosphere can be maintained in the chamber 48 located below the plate 33, between the two furnaces 5 and 18 in the first embodiment, while in the second embodiment the lower surface of the block 41 can be provided with a gas-tight cladding.

The plants described hereinabove allow the performance of a new process of manufacturing a glass ribbon. In the new process a glass ribbon 1 is formed by the rolling of molten glass between the rollers 2, 3 whereafter it is conveyed by the transporter rollers 4 and introduced into the first furnace 5 through the inlet slot 15. The glass ribbon 1 is deposited on the bath of non-oxidizable metal 12, preferably silver, at the location 16 close to the front end wall 9 of the furnace 5 where the glass ribbon temperature is close to that of the bath 12. The temperatures in the furnace 5 are controlled by suitable means. The glass ribbon 1 is slid over the metal bath 12 and passes out of the furnace 5 through the outlet slot 17. The glass ribbon 1 is then slid over the upper surface 34 of the carbon plate 33, or the carbon block 41, as the case may be, and then introduced into the second furnace 18 through the inlet slot 28. In the furnace 18 the glass ribbon 1 is slid over the second metal bath 25 which has a lower melting point than the metal bath 12. At the place 32 close to the rear end wall 23 of the furnace 18, the glass ribbon 1 is lifted from the surface of the metal bath 25 by the transporter rollers 30 which transport such glass ribbon through the lehr 31. The temperatures in the furnace 18 are controlled to cool the glass and solidify it progressively so that at the location 32 the glass ribbon can be engaged by the transporter rollers 30 without damage to the lower glass surface.

Clearly, the invention is not limited to the two embodiments illustrated and modifications may be made to the shape, arrangement and constitution of the elements of the invention without departing from the scope of the invention as defined by the following claims.

What I claim is:

1. Apparatus for manufacturing a glass ribbon comprising means for forming a glass ribbon in a highly plastic state, a tank containing a bath of molten material which is inert to air, the glass ribbon being fed onto the bath of molten material and advanced thereon, means for controlling cooling of the ribbon in said tank between a fire polishing temperature and a temperature above the melting point of the molten material, a second tank adjacent the first tank, said second tank containing a bath of molten material having a lower melting point than the material in the first said tank, said ribbon being fed from the first tank onto the bath of molten material in the second tank, a solid plate inert to glass at the operating temperatures in said tanks, said plate being disposed between the first and second tanks and having an upper surface on which the glass ribbon passes, said upper surface being somewhat above the level of the baths in the tanks, means for controlling the cooling of the ribbon in said second tank such that the ribbon is removed therefrom at a temperature at which the ribbon can be mechanically engaged without being damaged, and mechanical means for engaging the ribbon at its exit from the secondary bath for advancing the ribbon.

2. Apparatus as claimed in claim 1, wherein the upper surface of the solid plate is convex and is partially immersed in each of the baths of molten material.

3. Apparatus as claimed in claim 1, wherein the solid plate is constituted by carbon.

4. Apparatus as claimed in claim 1, wherein said plate constitutes end walls for said tanks and is in direct contact with the molten baths therein.

References Cited by the Examiner
UNITED STATES PATENTS

| | | | |
|---|---|---|---|
| 3,233,995 | 2/1966 | Javaux | 65—182 X |
| 3,241,937 | 3/1966 | Michalik et al. | 65—65 |

DONALL H. SYLVESTER, *Primary Examiner.*

A. D. KELLOGG, *Assistant Examiner.*